Oct. 14, 1947.        A. S. GOULD ET AL        2,429,021
BARRAGE ROCKET PROJECTOR
Filed March 15, 1945        3 Sheets-Sheet 1
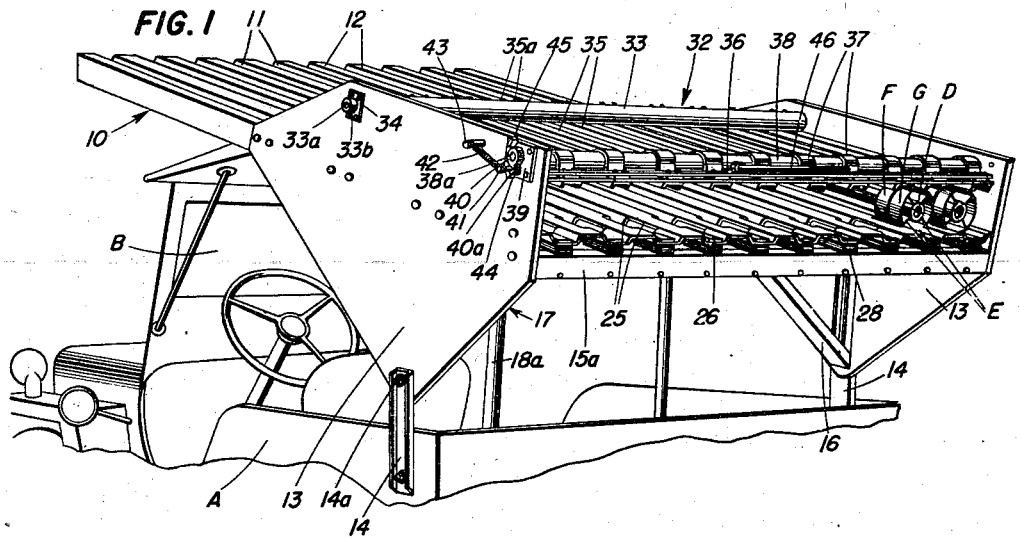
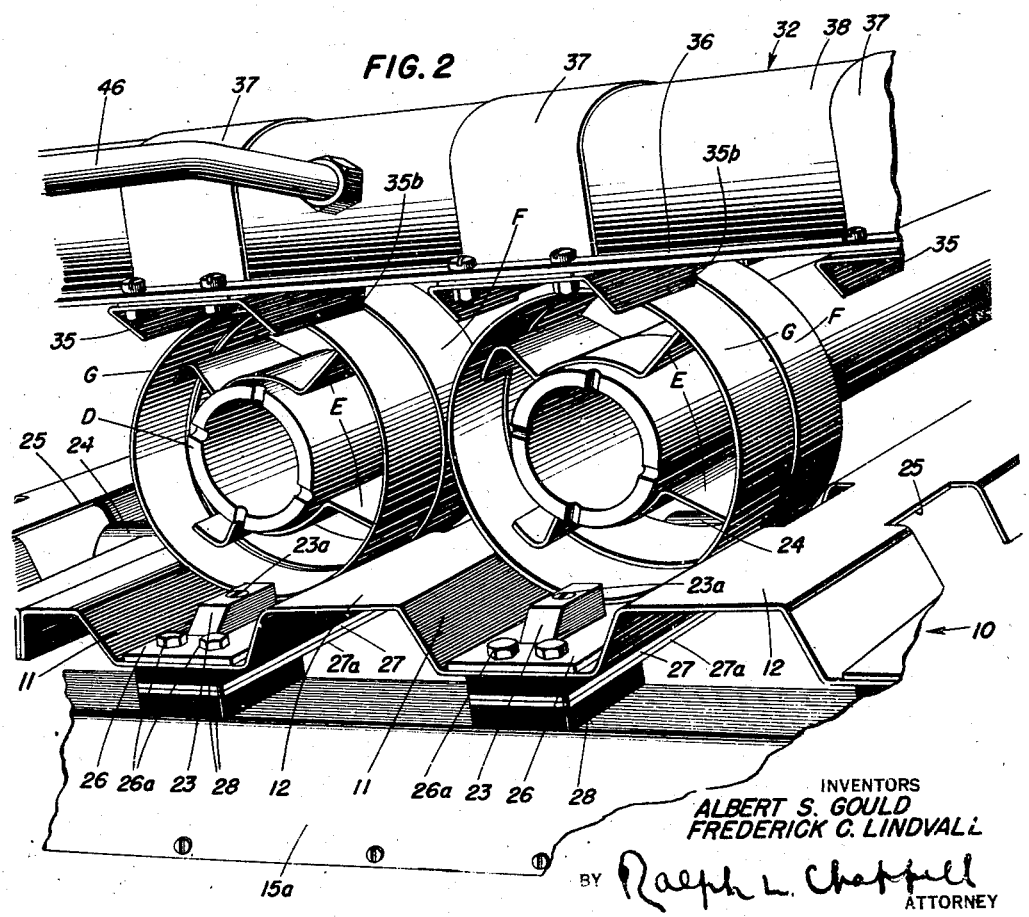
INVENTORS
ALBERT S. GOULD
FREDERICK C. LINDVALL
BY Ralph L. Chappell
ATTORNEY

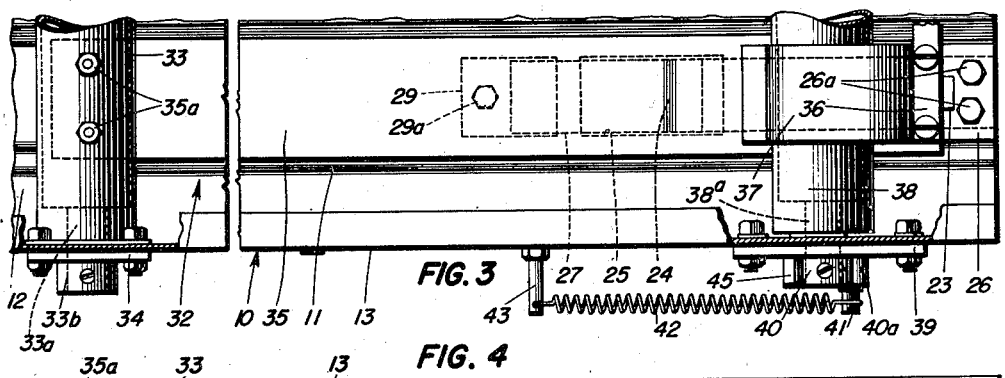
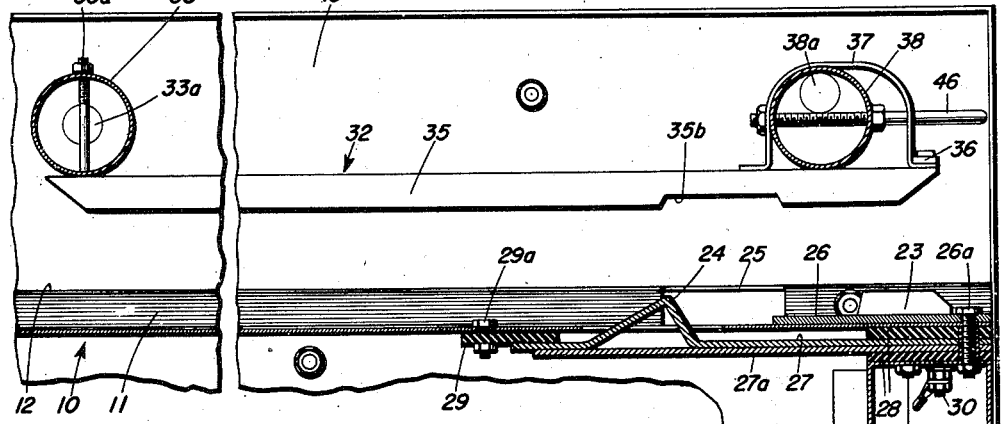
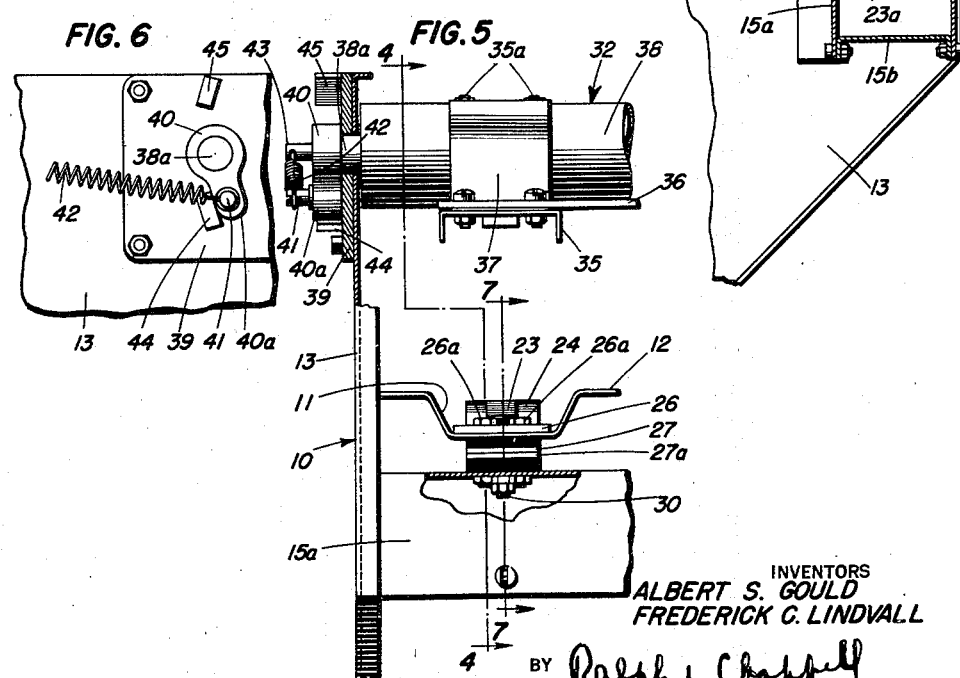

Oct. 14, 1947.    A. S. GOULD ET AL    2,429,021
BARRAGE ROCKET PROJECTOR
Filed March 15, 1945    3 Sheets-Sheet 3
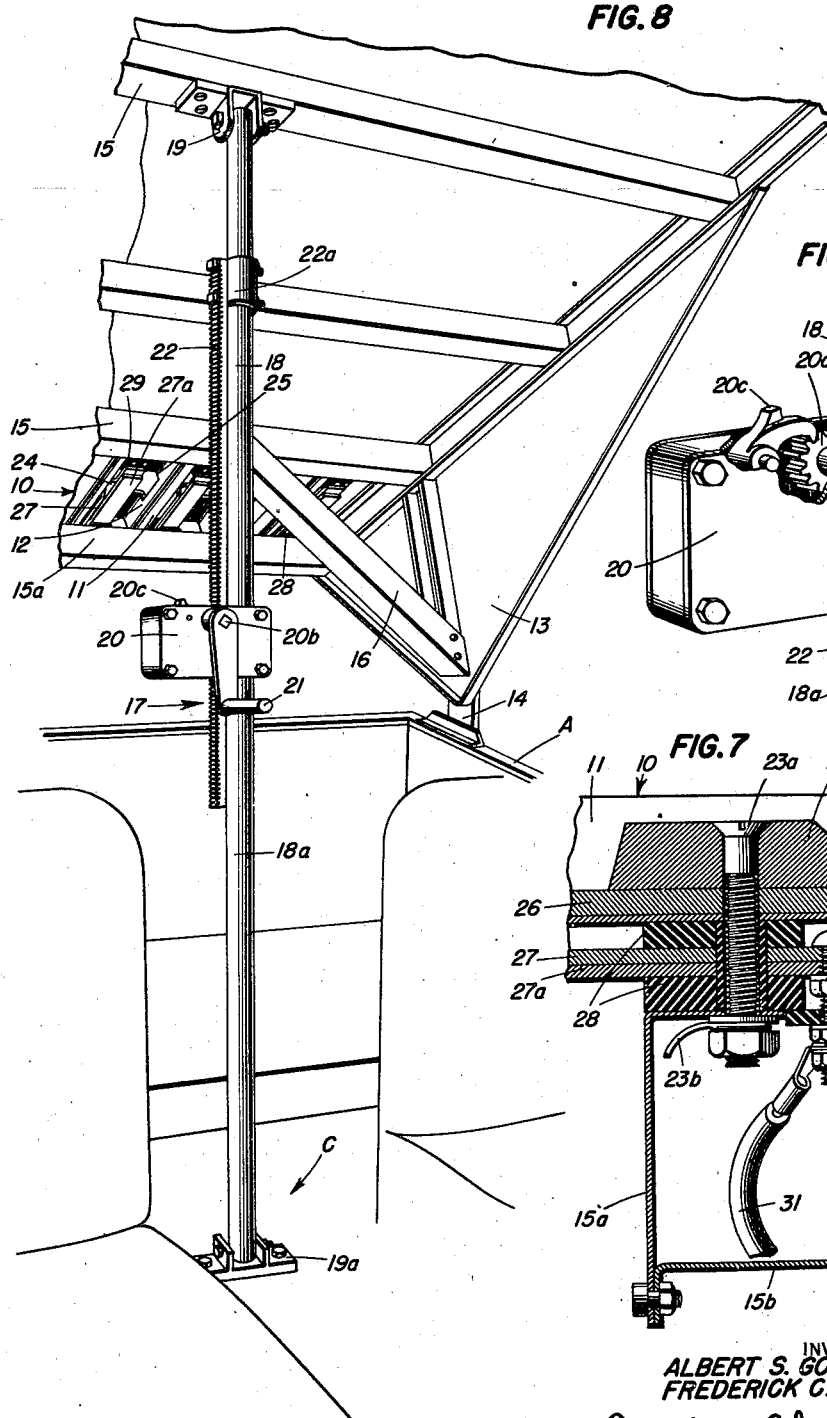
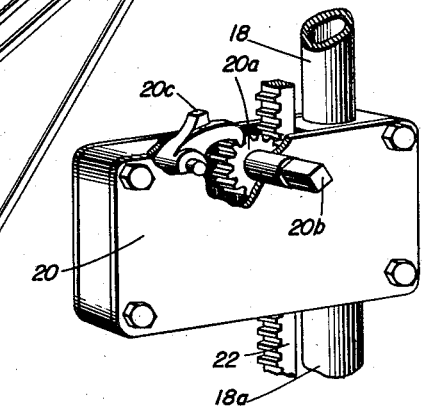
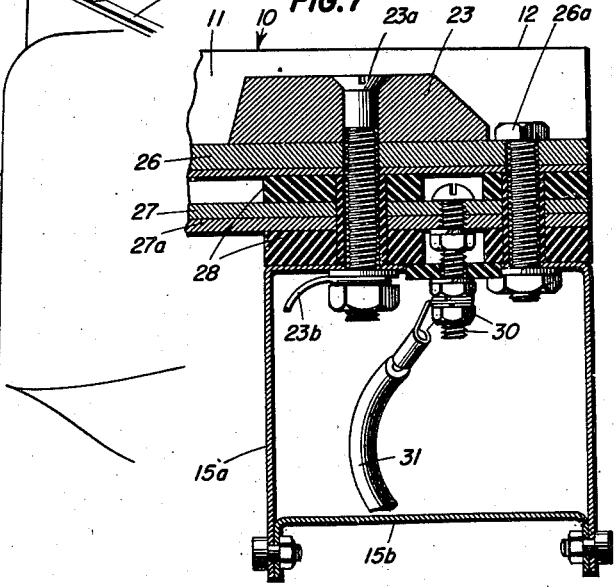
INVENTORS
ALBERT S. GOULD
FREDERICK C. LINDVALL
BY Ralph L Chappell
ATTORNEY Patented Oct. 14, 1947

2,429,021

UNITED STATES PATENT OFFICE 2,429,021

BARRAGE ROCKET PROJECTOR

Albert S. Gould, Pasadena, and Frederick C. Lindvall, Altadena, Calif., assignors to United States of America, as represented by the Secretary of the Navy Application March 15, 1945, Serial No. 582,954

14 Claims. (Cl. 89—1.7)

This invention relates to rocket projectors and more particularly to a barrage rocket projector of novel construction which may be transported in loaded condition to a firing position, is readily adjustable in elevation, and may be operated quickly and easily when in firing position.

One object of the invention resides in the provison of a barrage rocket projector of relatively light weight which is adapted to be mounted on a small size vehicle, such as a scout car commonly known as a "Jeep."

Another object of the invention is to provide a barrage rocket projector including a rocket locking device for retaining the rockets in firing position on the launcher, ready for instant use, whereby the launcher may be transported in loaded condition without danger of accidental displacement of the rockets.

Another object of the invention is to provide a barrage rocket projector of the character described in which the locking means for the rockets need not be unlocked to permit firing of the rockets, so that the rockets may be fired while the vehicle is in motion and the rockets held against accidental dislodgment.

Still another object is to provide a barrage rocket projector which serves as a canopy for a scout car and may be adjusted in elevation and fired from within the car, training in azimuth being accomplished by directing the car itself at the target.

In accordance with our invention, the rocket projector or launcher comprises a projector plate forming rocket guide means, preferably in the form of a plurality of guide channels, and a hinge or pivot connection between the projector plate and a mount, such as a scout car, the projector plate being tiltable on the pivot to adjust the elevation angle. An elevating mechanism may be provided inside the scout car for raising and lowering the projector plate on its pivot, the elevating mechanism having suitable locking means for holding the projector plate securely in a selected position. The rockets may be loaded on the projector plate before the launcher is to be used, and the rockets are held in the launcher against accidental displacement during transport and firing, by means of a rocket locking device. In the preferred construction, the rocket locking device comprises a plurality of locking members extending above and corresponding to the rocket guide channels in the projector plate, the locking members being movable between locking positions in which the members engage and retain the rockets on the projector plate during transportation and firing, and a raised position to permit reloading or removal of the rockets.

For a better understanding of the invention, reference may be had to the accompanying drawings, in which Fig. 1 is a perspective view of a barrage rocket launcher made in accordance with the invention, showing the launcher mounted on a scout car;

Fig. 2 is an enlarged perspective view of part of the rear end portion of the launcher, showing the rockets held in position by the locking device;

Fig. 3 is a plan view of part of the rear end portion of the launcher, showing the locking device for the rockets;

Fig. 4 is a sectional view on the line 4—4 in Fig. 5;

Fig. 5 is the rear end view of the part of the launcher shown in Fig. 3, with parts broken away;

Fig. 6 is a side view of part of the launcher illustrated in Fig. 5, showing a biasing means for retaining the rocket locking device in either one of its two positions;

Fig. 7 is a sectional view on the line 7—7 in Fig. 5;

Fig. 8 is a perspective view of the launcher, showing the elevating means, and

Fig. 9 is a detail perspective view of part of the elevating means shown in Fig. 8, with parts broken away.

The barrage rocket launcher, as shown, comprises a projector plate 10 corrugated transversely to form a series of longitudinal channels 11 separated by flat portions 12, the channels serving as guide means for the rockets, to be described presently, which fit closely in the channels. The sides of the projector plate 10 are connected to vertical side plates 13 which extend from the rear end of the projector plate to points about midway between its ends. Below the projector plate 10, the side plates 13 are of triangular shape, and their lower or apex ends are hinged to mounting brackets 14, as by means of pivot pins 14a. The projector plate 10 is provided underneath with cross braces 15, 15a and diagonal braces 16, the latter extending between the lower corners of the side plates and one of the cross braces 15, as shown in Fig. 8.

The mounting brackets 14 are secured to the side walls A of a scout car or "Jeep" at points adjacent the rear end of the body of the car, and the plate 10 extends forward over the windshield B of the scout car, forming a canopy or top.

The projector plate 10 may be tilted to different elevation angles about the pivots 14a on the brackets 14. To facilitate tilting of the plate 10, we provide an elevating mechanism 17, shown in Fig. 8. As there shown, the elevating mechanism comprises a pair of telescoping tubes 18 and 18a which are pivoted at their opposite ends to brackets 19 and 19a mounted on one of the cross members 15 and the floor C of the scout car, respectively. The lower telescoping tube 18a supports at its upper end a pinion housing 20 which contains a pinion gear 20a (Fig. 9) mounted on a shaft 20b adapted to be driven by a suitable handle 21. A locking device, such as a dog 20c, is mounted in the housing 20 for engagement with the teeth of pinion 20a to lock the pinion against rotation. The pinion 20a engages a rack 22 extending vertically through housing 20 and secured to the upper telescoping tube 18, as by means of a clamp 22a. Thus, by turning the crank 21, the projector plate 10 may be raised or lowered about the pivot mountings 14a, through operation of the pinion 20a and rack 22, and when the projector plate is at the desired angle of elevation, the dog 20c may be moved into engagement with pinion 20a to lock the elevating mechanism against further movement. It will be apparent that the elevating mechanism may be released for adjustment by simply raising the dog 20c from engagement with pinion 20a.

The guide channels 11 are adapted to receive and support rocket projectiles, such as those disclosed in copending applications of C. C. Lauritsen, Serial No. 481,644 and Serial No. 481,645. Each rocket comprises an explosive container or head (not shown), a rocket motor D to the rear of the head, tail fins E on the motor, and a pair of tail rings F and G supported by the tail fins. The forward tail ring F is electrically insulated from the rocket body, while the rear tail ring G is grounded to the rocket motor. The rings F and G are electrically connected to an igniter (not shown) within the motor D, the igniter when energized being operable to initiate combustion of a propellent grain in the rocket motor, as disclosed in the above-identified copending applications.

The rockets are placed in the guide channels 11 with the rocket tail rings F and G at the rear end portion of the projector, as shown in Figs. 1 and 2. The rear tail ring G of each rocket engages a grounded contact 23, while the insulated tail ring F engages a live contact 24 in front of contact 23. Clearance notches 25 are provided in each guide channel 11 so that the insulated tail ring F does not contact the projector plate 10.

In each guide channel 11, the rear or grounded contact 23 is in the form of a metal block secured to a conducting plate 26 on the bottom of the channel, while the insulated contact 24 is formed on a flexible spring arm 27 disposed below the channel bottom and extending forwardly from the plate 26. An additional spring arm 27a engages the bottom of arm 27, and the arms 27 and 27a are clamped between insulating blocks 28 against the lower face of the corresponding channel bottom. The inherent spring action in contact arms 27 and 27a urges contact 24 upwardly through an opening in the bottom of the guide channel, the upward movement of the contact being limited by an insulating stop 29 secured to the lower face of the projector plate near the front ends of the contact arms, as by means of a bolt 29a. The contact arms 27 and 27a and their insulating blocks 28 are mounted on the bottom of the guide channel by means of bolts 23a and 26a extending through plate 26 and projector 10 and having suitable insulating sleeves adjacent the contact arms. The bolt 23a also extends through the grounded contact 23 and carries at its lower end a conductor 23b disposed within the rear cross member 15a, the latter being channel-shaped and provided with a closure plate 15b.

It will be understood that each of the guide channels 11 is provided with a set of contacts 23, 24, the conductors 23b from the grounded contacts 23 being led through the cross member 15a to a suitable plug or other access to one side of a current source (not shown). A bolt 30 is secured to each contact arm 27 within the insulating blocks 28 and extends downwardly into the cross member 15a, where the bolt is connected to a conductor 31 leading through the cross member to the other side of the current source.

In order that the rockets D may be held in position against accidental displacement during transportation of the projector, a clamping means 32 is provided. The clamping means comprises a forward bar 33 extending between the side plates 13 above the projector plate 10 at a location approximately opposite the forward ends of the rockets. The cross bar 33, as shown, is hollow and has trunnions 33a at its ends which extend through and are journalled in the side plates 13 and bearing plates 34 secured to the outer faces of the side plates. A collar 33b is mounted on the protruding end portion of each trunnion 33a adjacent the plate 34. The cross bar 33 is thus rotatable in the side plates 13 and is secured against axial displacement.

Clamping rails 35 are connected to the cross bar 33, as by means of bolts 35a. One clamping rail 35 is provided for each guide channel 11 and extends rearwardly from the cross bar so as to overlie the channel in spaced relation thereto. The clamping rails are channel-shaped in cross section with their flanges facing downwardly and having cutaway portions 35b directly overlying the cutaway portions 25 of the underlying guide channels. At their rear ends, the clamping rails are connected together by a tie strap 36 extending transversely of the rails. An upwardly directed loop 37 is mounted on the rear end portion of each guide rail 35, the rear end of the loop being clamped between the guide rail and the tie strap 36. A clamp bar 38 extends through the loops 37 between the side plates 13, the clamp bar, as shown, being hollow and having eccentrically mounted trunnions 38a at its ends. The trunnions 38a extend through and are journalled in the side plates 13 and bearing plates 39 secured to the outer faces of the side plates. A collar 40 is mounted on the protruding end of each trunnion 38a adjacent the bearing plate 39 and has an arm 40a provided with a pin 41. A tension spring 42 is secured at one end to the pin 41 and at the other end to a pin 43 on side plate 13. The spring 42 serves as a toggle to maintain the collar 40 and clamp bar 38 in either of two positions against stops 44 and 45 engageable by the arm 40a, these two positions corresponding to rocket clamping and rocket releasing positions, respectively. The clamping bar 38 has a handle 46 for rotating the bar on the trunnions 38a between the rocket clamping and rocket releasing positions defined by stops 44 and 45.

In the rocket clamping position of bar 38 (Fig. 4), the flanges of rails 35 engage the upper side portions of the rockets D mounted in the guide channels 11, the cutaway flange portions 35b serving to prevent contact between the rails and the insulated tail rings F. In this position of the clamping means 32, the rockets in the guide channels are held securely by the rails 35 against lateral or upward displacement during transport of the projector, the grounded contacts 23 preventing rearward displacement of the rockets. The clamp bar 38 is held securely in its clamping position against stop 44 by the spring 42.

The rockets are fired with the clamping or locking means in its securing position. The spring contacts 24 are so shaped that they deflect as the rocket moves forward from under the upper clamping rails 35.

When it is desired to release the rockets D, the handle 46 is forced upwardly from the position shown in Fig. 1, thereby rotating the clamping bar 38 on the eccentric trunnions 38a and, through the loops 37, elevating the rear end portions of the clamping rails 35. The arm 40a is thus rotated away from the lower stop 44 and urged by spring 42 against the upper stop 45, whereby the clamping device is held firmly in its releasing position. It will be understood that during elevation of the rear end portions of the rails 35, through rotation of clamp bar 38, the rails pivot slightly on the forward cross bar 33 which is rotatable to accommodate the elevating movement.

In the use of the new launcher, the rockets D are loaded on projector plate 10 from the rear end thereof, with the rear ends of the clamping rails 35 in their elevated positions, as described. In loading the rockets, they are inserted between the projector plate and the elevated ends of the clamping rails and moved forwardly in the guide channels 11 until the rockets clear the grounded contacts 23. The rockets are then moved to the rear in the guide channels until the rear tail rings G engage the contacts 23, whereby the forward or insulated tail rings F engage the insulated contacts 24. The handle 46 is then depressed to rotate the clamp bar 38 on the eccentric trunnions 38a, so that the clamping rails 35 are lowered into engagement with the upper side portions of the rockets. The rockets are thus clamped along their lengths by the flanges of rails 35 and are held securely against accidental displacement during transport of the projector. When the projector is in firing position, or while the vehicle is in motion, it is aimed in train by directing the transporting vehicle itself at the target, the desired elevation angle being obtained by adjustment of the elevating mechanism 17 through handle 21. When the launcher is aimed, the rockets are fired, individually or in a salvo, by closing the circuits through the current source (not shown), the respective wires 23b, 31 and the respective contacts 23 and 24.

It will be observed that the rocket launcher of the present invention is of simple and rugged construction, may be readily adjusted in elevation from within the transporting vehicle, and includes means operable quickly and easily to clamp the rockets securely in their firing positions on the projector or to release the rockets for firing, as desired. The launcher, as shown, is adapted to accommodate 10 rockets at a time in the guide channels 11, although it will be understood that any other desired number of guide channels may be provided.

We claim:

1. A barrage rocket projector comprising a mount, a projector plate having a rocket guiding channel, a pivotal connection between the mount and the projector plate whereby the plate may be tilted to different firing angles, and releasable means for locking a rocket in said channel against accidental displacement.

2. A barrage rocket projector comprising a mount, a projector plate tiltable on said mount to different elevation angles and having a rocket guiding channel, adjustment means for tilting the projector plate on the mount, and releasable means for locking a rocket in said channel against accidental displacement.

3. A barrage rocket projector comprising a mount, a projector plate tiltable on the mount to different elevation angles and having a rocket guiding channel, means for locking a rocket in said channel against accidental displacement, and means for releasing said locking means to permit discharge of the rocket from the channel.

4. A rocket projector comprising a projector plate having at least one rocket guiding channel, side plates on said projector plate, means for pivotally mounting the side plates whereby the projector plate may be tilted on the side plates to different angles of elevation, means for securing the projector plate at a selected angle of elevation, and a releasable clamping device extending between said side plates over the projector plate and coacting with the projector to retain a rocket in the guide channel against accidental displacement.

5. A rocket projector comprising a projector plate having at least one rocket guiding channel, side plates on said projector plate, means for pivotally mounting the side plates whereby the projector plate may be tilted on the side plates to different angles of elevation, means for securing the projector plate at a selected angle of elevation, a rocket clamping device extending between the side plates over said projector plate and coacting with the projector plate to retain a rocket in said guide channel against accidental displacement, and means for moving said clamping means to release the rocket.

6. In a rocket projector including a projector plate having a rocket guiding channel, and a rocket clamping device extending over the projector plate, said device comprising a rocket retaining member overlying said guide channel, a pivotal mount for one end of said member, and a rocket securing device at the other end of said member.

7. In a barrage rocket projector including a projector plate having a plurality of rocket guiding channels, a rocket clamping device extending over the projector plate and comprising a retaining member overlying each of said guide channels and engageable with a rocket in the channel to retain the rocket against accidental displacement, and eccentric means common to said retaining members for raising and lowering said members between rocket retaining and rocket releasing positions relative to the projector plate.

8. In a barrage rocket projector including a projector plate having a plurality of rocket guiding channels, and side plates extending upwardly from the projector plate, a rocket clamping device comprising a bar extending between the side plates above the projector plate and intermediate the ends thereof, a plurality of inverted channel members connected at their front end portions to the bar and extending rearwardly therefrom in generally parallel relation to the guide channels, one channel member overlying each guide channel in spaced relation thereto, and means extending between the side plates adjacent the rear end of the projector plate and common to said channel members for raising and lowering the rear ends of the channel members to rocket releasing and rocket clamping positions.

9. In a barrage rocket projector including a projector plate having a plurality of rocket guiding channels, and side plates extending upwardly from the projector plate, a rocket clamping device comprising a bar extending between the side plates above the projector plate and intermediate the ends thereof, a plurality of inverted channel members connected at their front end portions to the bar and extending rearwardly therefrom in generally parallel relation to the guide channels, one channel member overlying each guide channel in spaced relation thereto, and a rotatable bar eccentrically mounted between the side plates and connected to the rear end portions of said channel members for raising and lowering the channel members to rocket releasing and rocket clamping positions.

10. In a barrage rocket projector including a projector plate having a plurality of rocket guiding channels, and side plates extending upwardly from the projector plate, a rocket clamping device comprising a cross member extending between the side plates above the projector plate and intermediate the ends thereof, a plurality of inverted channel members connected at their front end portions to the cross member and extending rearwardly therefrom in generally parallel relation to the guide channels, one channel member overlying each guide channel in spaced relation thereto, a rotatable bar eccentrically mounted between the side plates and overlying the rear end portions of the channel members, an upwardly directed loop on each channel member through which said bar extends, and means for rotating the bar to raise and lower the channel members to rocket releasing and rocket clamping positions.

11. In a barrage rocket projector including a projector plate having a plurality of rocket guiding channels, and side plates extending upwardly from the projector plate, a rocket clamping device comprising a cross member extending between the side plates above the projector plate and intermediate the ends thereof, a plurality of inverted channel members connected at their front end portions to the cross member and extending rearwardly therefrom in generally parallel relation to the guide channels, one channel member overlying each guide channel in spaced relation thereto, a rotatable bar eccentrically mounted between the side plates and overlying the rear end positions of the channel members, an upwardly directed loop on each channel member through which said rotatable bar extends, means for rotating said bar to raise and lower the channel members between rocket releasing and rocket clamping positions, and stop means for limiting said rotation of the bar.

12. A barrage rocket projector comprising a projector plate having a plurality of rocket guiding channels, side plates on the projector plate, a mount on which the side plates are tiltable to different elevation angles of the projector plate, a cross member extending between the side plates above the projector plate and intermediate the ends thereof, a plurality of clamping elements connected at their front end portions to the cross member and extending rearwardly from the cross member in parallel relation to said guide channels, one of said clamping elements overlying each of said guide channels in spaced relation thereto, a bar extending between the side plates adjacent the rear end of the projector plate, a trunnion eccentrically mounted on each end of the bar and journalled in the adjacent side plate, stop means for limiting rotation of the bar on said trunnions and defining rocket releasing and rocket clamping positions of the bar, a toggle spring connected to the bar and normally maintaining the bar in one of said stop positions, an upwardly directed loop on the rear end portion of each of said clamping elements and through which said bar extends, and means for rotating the bar between said stop positions to raise and lower the clamping elements to rocket releasing and rocket clamping positions.

13. A barrage rocket projector comprising a corrugated projector plate in which the corrugations define a series of longitudinal channels to contain rockets, an automotive vehicular mount on which the plate is superimposed to form a canopy thereover, said mount being adapted for ready orientation whereby to train the rockets in azimuth, pivot means by which one end of the plate is connected to the framing of said mount, and adjusting means between the other end of the plate and the mount whereby to swing the plate in elevation.

14. A barrage rocket projector comprising a corrugated projector plate in which the corrugations define a series of longitudinal channels to contain rockets, an automotive vehicular mount on which the plate is superimposed to form a canopy thereover, said mount being adapted for ready orientation whereby to train the rockets in azimuth, pivot means by which one end of the plate is connected to the framing of said mount, adjusting means between the other end of the plate and the mount whereby to swing the plate in elevation, and securing means disposed across the rockets, holding them from accidental displacement from the channels during rough motion of the vehicular mount.

ALBERT S. GOULD.
FREDERICK C. LINDVALL.

REFERENCES CITED

The following references are of record in the file of this patent:

UNITED STATES PATENTS

| Number | Name | Date |
|---|---|---|
| 96,143 | Peck | Oct. 26, 1869 |
| 455,279 | Cunningham | June 30, 1891 |
| 932,270 | Goodwin | Aug. 24, 1909 |
| 1,018,312 | Gherassimoff | Feb. 20, 1912 |
| 1,351,649 | Holecek | Aug. 31, 1920 |
| 1,395,630 | Davis | Nov. 1, 1921 |

FOREIGN PATENTS

| Number | Country | Date |
|---|---|---|
| 25,326 | Great Britain | 1894 |